United States Patent
Nishiji et al.

(10) Patent No.: US 10,794,460 B2
(45) Date of Patent: Oct. 6, 2020

(54) DIFFERENTIAL DEVICE

(71) Applicant: JTEKT CORPORATION, Osaka-shi (JP)

(72) Inventors: Makoto Nishiji, Kariya (JP); Tomoki Yoshihama, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 82 days.

(21) Appl. No.: 16/008,144

(22) Filed: Jun. 14, 2018

(65) Prior Publication Data

US 2018/0372202 A1    Dec. 27, 2018

(30) Foreign Application Priority Data

Jun. 21, 2017   (JP) .................................. 2017-121376

(51) Int. Cl.
| | |
|---|---|
| *F16H 48/11* | (2012.01) |
| *F16H 48/40* | (2012.01) |
| *F16H 48/28* | (2012.01) |
| *F16H 48/10* | (2012.01) |

(52) U.S. Cl.
CPC ............. *F16H 48/11* (2013.01); *F16H 48/28* (2013.01); *F16H 48/40* (2013.01); *F16H 2048/106* (2013.01)

(58) Field of Classification Search
None
See application file for complete search history.

(56) References Cited

U.S. PATENT DOCUMENTS

| | | | | | |
|---|---|---|---|---|---|
| 1,454,578 | A | * | 5/1923 | Towler .................. | F16H 48/285 475/249 |
| 2,178,613 | A | * | 11/1939 | Seeck .................... | F16H 48/285 475/226 |
| 3,406,593 | A | * | 10/1968 | Vesey .................... | F16H 48/285 475/249 |
| 3,738,192 | A | * | 6/1973 | Belansky ................ | F16H 48/10 475/249 |
| 4,831,890 | A | * | 5/1989 | Valentin ................ | F16H 48/285 475/227 |

(Continued)

FOREIGN PATENT DOCUMENTS

| | | |
|---|---|---|
| JP | 2002-81526 | 3/2002 |
| JP | 2009-197976 | 9/2009 |

*Primary Examiner* — Dirk Wright
(74) *Attorney, Agent, or Firm* — Oblon, McClelland, Maier & Neustadt, L.L.P.

(57) ABSTRACT

A differential device includes: first and second side gears disposed side by side in the rotational axis direction; a pinion gear set in which two second pinion gears are meshed with a first pinion gear; and a housing that holds the pinion gear set. The first pinion gear has an axially one end-side gear portion meshed with the first side gear, and an axially other end-side gear portion meshed with the two second pinion gears. The axially one end-side gear portion and the axially other end-side gear portion are integral with each other. The two second pinion gears are meshed with the second side gear at positions away from each other in the circumferential direction of the second side gear. The axially other end-side gear portion of the first pinion gear is meshed with the two second pinion gears at positions on the radially outer side of the second side gear.

8 Claims, 4 Drawing Sheets

(56) References Cited

U.S. PATENT DOCUMENTS

| | | | | |
|---|---|---|---|---|
| 5,147,252 A | * | 9/1992 | Mace | F16H 48/285 252/75 |
| 5,295,922 A | * | 3/1994 | Amborn | B60K 17/346 475/248 |
| 5,389,048 A | * | 2/1995 | Carlson | F16H 48/285 475/248 |
| 5,484,348 A | * | 1/1996 | Brown | F16H 48/11 475/248 |
| 5,637,050 A | * | 6/1997 | Chludek | F16H 48/285 475/249 |
| 5,971,882 A | * | 10/1999 | Nishiji | F16H 48/285 475/252 |
| 6,402,656 B1 | * | 6/2002 | Peralta | F16H 48/10 475/249 |
| 6,620,074 B2 | * | 9/2003 | Kanazawa | F16H 48/10 475/248 |
| 6,634,979 B1 | * | 10/2003 | Quaife | F16H 48/285 475/249 |
| 7,086,985 B2 | * | 8/2006 | Nakajima | F16H 48/10 475/248 |
| 8,057,352 B2 | * | 11/2011 | Nishiji | F16H 48/285 475/180 |
| 8,182,387 B2 | * | 5/2012 | Fujii | F16H 57/082 475/220 |
| 8,287,418 B2 | * | 10/2012 | McVea | F16H 48/10 475/249 |
| 8,388,487 B2 | * | 3/2013 | Fujii | F16D 27/115 475/150 |
| 8,439,788 B2 | * | 5/2013 | Fujii | F16H 48/30 475/249 |
| 2002/0025878 A1 | | 2/2002 | Kam | |
| 2009/0215576 A1 | | 8/2009 | Nishiji | |

* cited by examiner

DIFFERENTIAL DEVICE

INCORPORATION BY REFERENCE

The disclosure of Japanese Patent Application No. 2017-121376 filed on Jun. 21, 2017 including the specification, drawings and abstract is incorporated herein by reference in its entirety.

BACKGROUND OF THE INVENTION

1. Field of the Invention

The present invention relates to a differential device that distributes an input drive force to a pair of rotary members while allowing differential motion.

2. Description of the Related Art

A differential device that distributes an input drive force to a pair of rotary members while allowing differential motion has hitherto been used as a differential device of a vehicle, for example. In some of such differential devices, a pair of side gears is coupled to each other by a plurality of pinion gears so as to make differential motion, and the pair of side gears and the plurality of pinion gears are disposed in parallel with each other. See Japanese Patent Application Publication No. 2002-081526 (JP 2002-081526 A) and Japanese Patent Application Publication No. 2009-197976 (JP 2009-197976 A), for example.

In the differential device (differential motion restriction device) described in JP 2002-081526 A, first and second side gears are coupled to each other by four pinion gear pairs so as to make differential motion. Each of the pinion gear pairs includes two pinion gears meshed with each other. One of the pinion gears meshed with the first side gear and the other pinion gear meshed with the second side gear. The one pinion gear and the other pinion gear are meshed with each other at both end portions thereof in the axial direction. The one pinion gear and the first side gear, and the other pinion gear and the second side gear, are meshed with each other between the meshing portions between the pinion gears.

The present applicant proposes the differential device described in JP 2009-197976 A as a differential device with a reduced size in the axial direction. In this differential device, one of pinion gears of a pair has two, large and small, gear portions with different pitch circle diameters. The large diameter gear portion is meshed with a first side gear and the small diameter gear portion is meshed with the other pinion gear on the outer peripheral side of a second side gear. The other pinion gear is meshed with the small diameter gear portion of the one pinion gear at one part thereof in the circumferential direction, and meshed with the second side gear at another part thereof in the circumferential direction.

With the configuration of the differential device described in JP 2009-197976 A, the axial length of the pinion gears can be reduced compared to the differential device described in JP 2002-081526 A, which enables a reduction in size of the differential device. In the differential device described in JP 2009-197976 A, however, the small diameter gear portion of the one pinion gear receives a force in the direction toward the second side gear depending on the rotational direction of the other pinion gear. Thus, it is necessary to form a differential case having a gear support portion denoted by symbol 20F in FIG. 2 of JP 2009-197976 A, and interpose the gear support portion between the small diameter gear portion of the one pinion gear and the second side gear. Therefore, man-hours required for processing the differential case is increased.

In addition, the other pinion gear is meshed with the small diameter gear portion of the one pinion gear and the second side gear at two locations in the circumferential direction, and thus carries a larger burden during transfer of a drive force. In order to reduce such a burden, it is necessary to make the length of meshing between the second side gear and the other pinion gear longer than the length of meshing between the first side gear and the large diameter gear portion of the one pinion gear. This constitutes a constraint on the reduction in size of the differential device in the axial direction.

SUMMARY OF THE INVENTION

It is an object of the present invention to provide a differential device with a reduced size while suppressing an increase in man-hours for processing.

According to an aspect of the present invention, a differential device includes:

first and second side gears disposed side by side in a rotational axis direction;

a pinion gear set composed of a plurality of pinion gears meshed with each other; and a housing that holds the pinion gears.

In the differential device, the first and second side gears are coupled to each other by the pinion gear set so as to make differential motion.

The pinion gear set has a first pinion gear meshed with the first side gear and a plurality of second pinion gears meshed with the second side gear. The first pinion gear and the second pinion gears are held in parallel with each other by the housing. The first pinion gear has an axially one end-side gear portion meshed with the first side gear and an axially other end-side gear portion meshed with the second pinion gears. The axially one end-side gear portion and the axially other end-side gear portion are integral with each other. The second pinion gears are meshed with the second side gear at positions away from each other in a circumferential direction of the second side gear. The axially other end-side gear portion of the first pinion gear is meshed with the second pinion gears at positions on a radially outer side of the second side gear.

With the differential device according to the aspect described above, it is possible to achieve a size reduction while suppressing an increase in man-hours for processing.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1A:
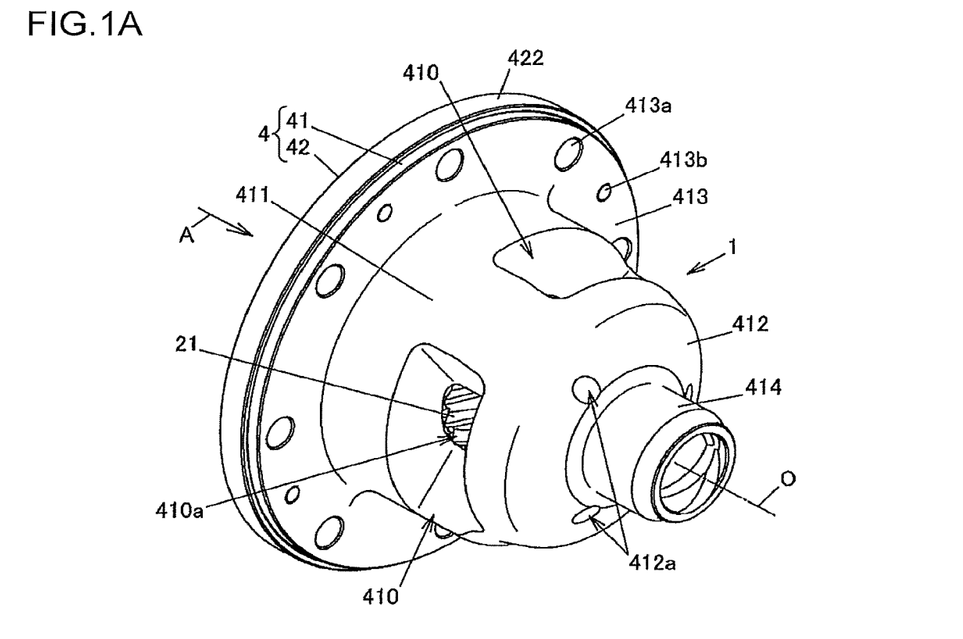
FIG. 1A is a perspective view illustrating a differential device according to an embodiment of the present invention, illustrating the appearance of the entire device.
Figure 1B:
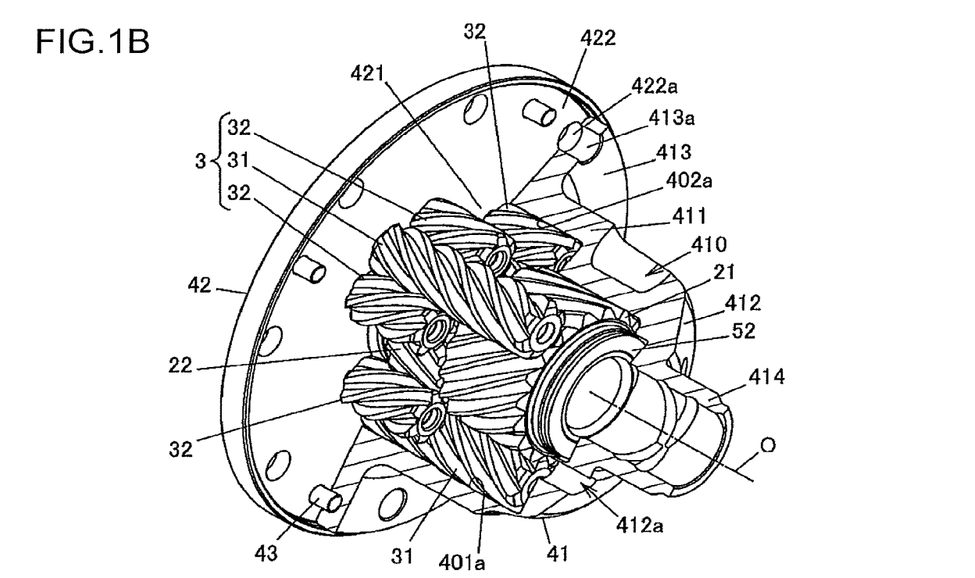
FIG. 1B is a perspective view illustrating the differential device according to the embodiment of the present invention, illustrating the inside thereof with a housing partially cut away.
Figure 2:
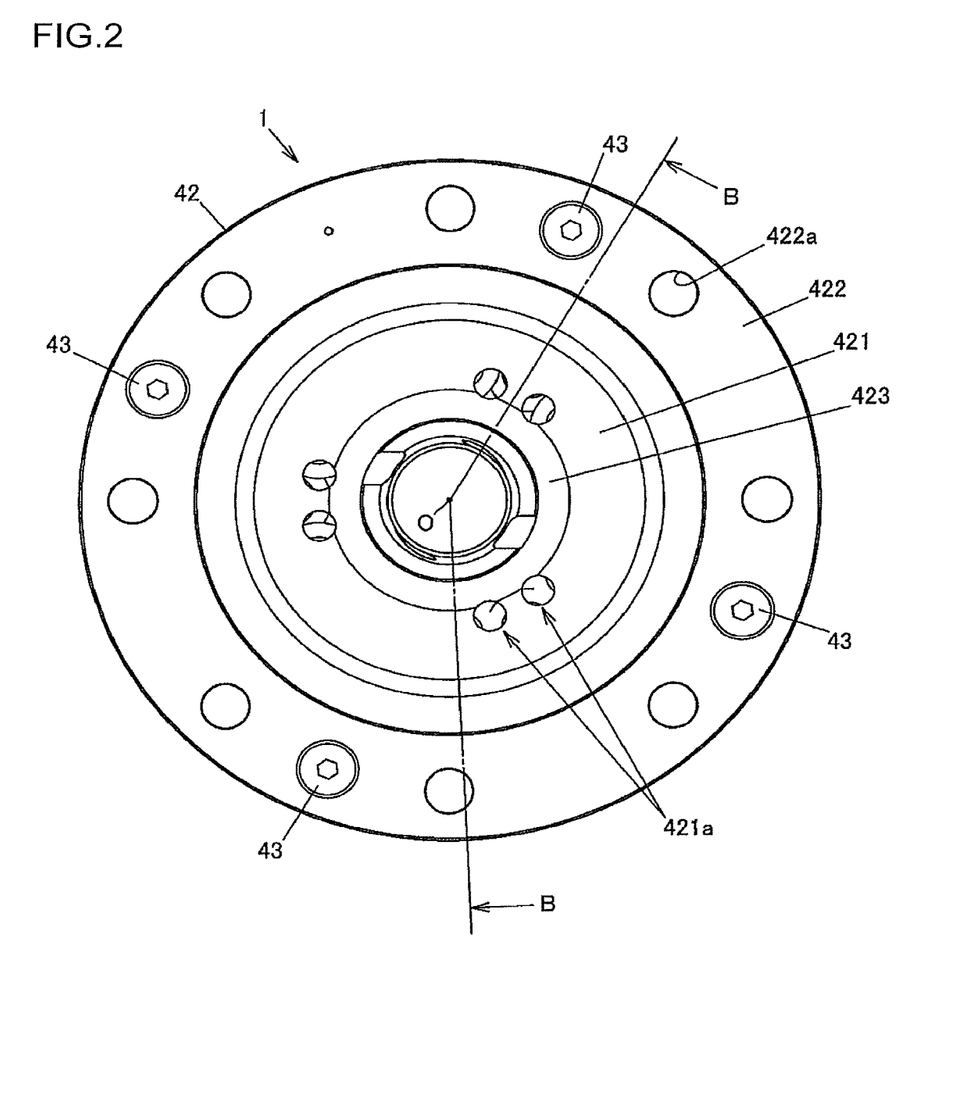
FIG. 2 is a view seen along the arrow A of FIG. 1A.
Figure 3:
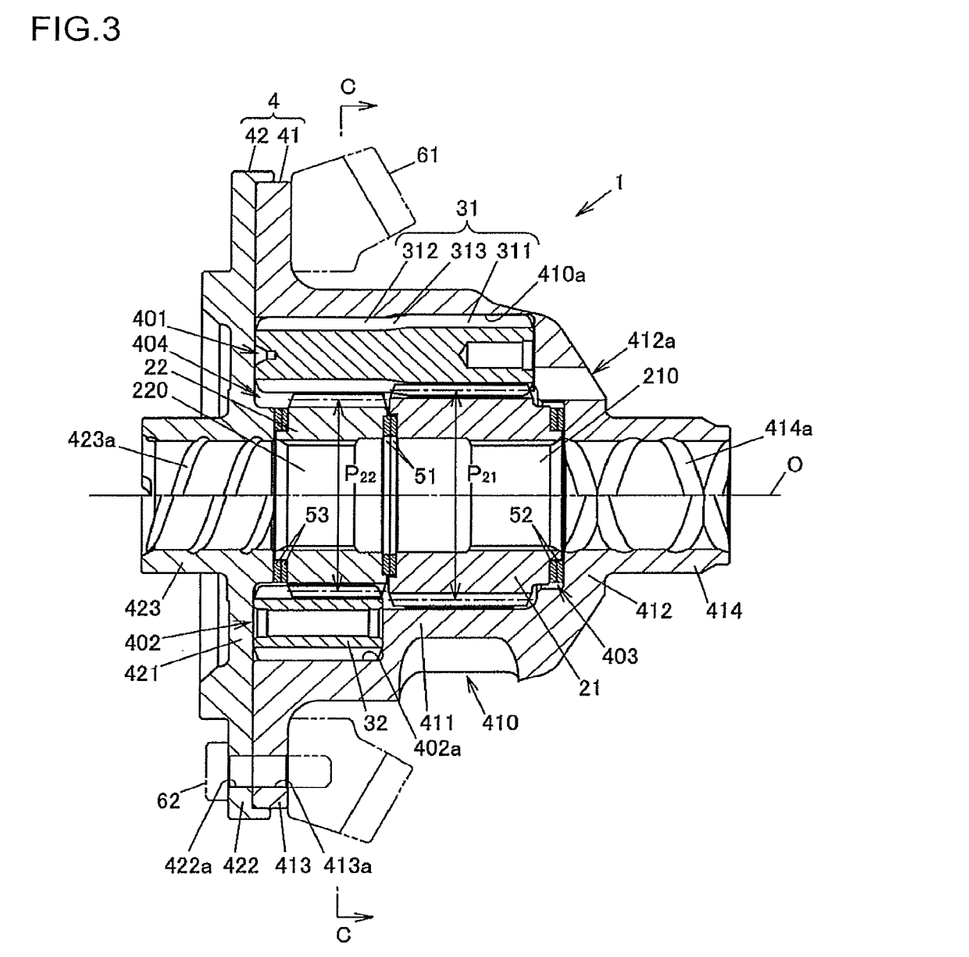
FIG. 3 is a sectional view taken along the line B-B of FIG. 2.
Figure 4:
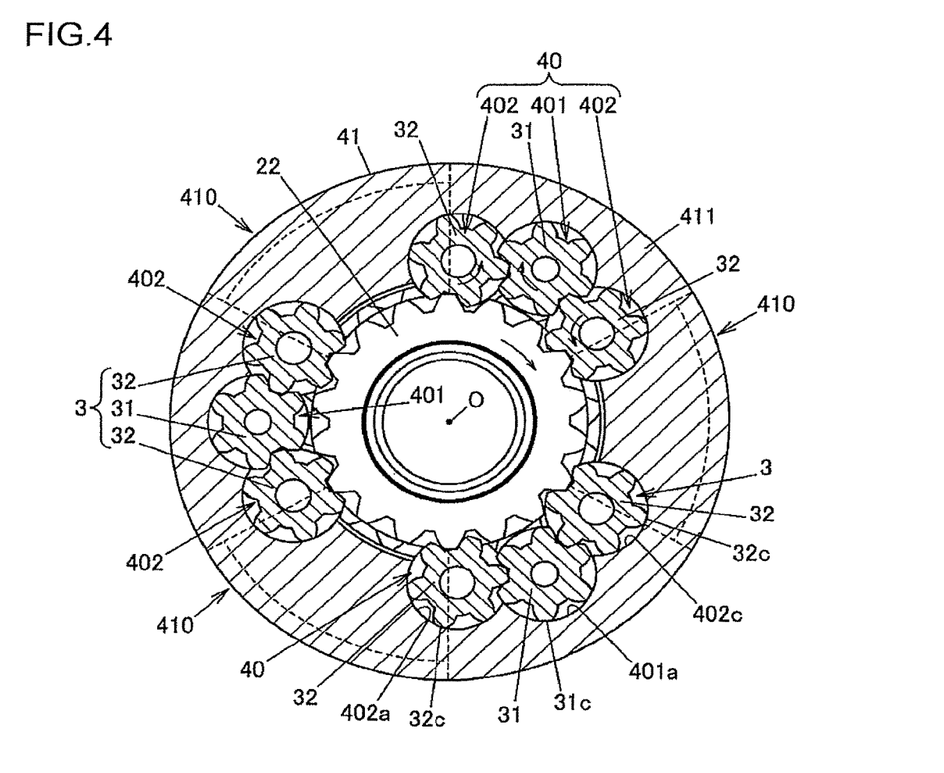
FIG. 4 is an axial cross-sectional view of the differential device taken along the line C-C of FIG. 3.

An embodiment of the present invention will be described with reference to FIGS. 1 to 5. FIG. 1A is a perspective view illustrating a differential device according to an embodiment of the present invention, illustrating the appearance of the entire device. FIG. 1B is a perspective view illustrating the differential device according to the embodiment of the present invention, illustrating the inside thereof with a housing partially cut away. FIG. 2 is a view seen along the arrow A of FIG. 1A. FIG. 3 is a sectional view taken along the line B-B of FIG. 2. FIG. 4 is an axial cross-sectional view of the differential device taken along the line C-C of FIG. 3.

A differential device 1 is mounted on a vehicle, and used to distribute an input drive force to a pair of drive shafts while allowing differential motion. In the present embodiment, the differential device 1 is used to distribute a drive force of a drive source such as an engine to drive shafts coupled to right and left wheels while allowing differential motion. However, the differential device 1 can be mounted on a four-wheel-drive vehicle, and used as a center differential that distributes a drive force to front and rear propeller shafts.

The differential device 1 includes a first side gear 21 and a second side gear 22 disposed side by side in the rotational axis direction, a plurality of pinion gear sets 3, and a housing 4 that houses the first side gear 21, the second side gear 22, and the pinion gear sets 3. In the present embodiment, the differential device 1 has three pinion gear sets 3. The first side gear 21 and the second side gear 22 are coupled to each other so as to make differential rotation through the pinion gear sets 3.

Each of the pinion gear sets 3 includes a plurality of pinion gears meshed with each other. In the present embodiment, each of the pinion gear sets 3 is composed of one first pinion gear 31 and two second pinion gears 32. The first pinion gear 31 is meshed with the first side gear 21. The second pinion gears 32 are meshed with the second side gear 22. In addition, the first pinion gear 31 and the second pinion gears 32 are meshed with each other while being held in parallel with each other by the housing 4. The two second pinion gears 32 have the same specifications such as the pitch circle diameter and the axial length.

The first side gear 21, the second side gear 22, the first pinion gears 31, and the second pinion gears 32 are each a helical gear. The outer peripheral surface of each gear is provided with helical teeth. A spline fitting hole 210 is formed at the center portion of the first side gear 21. One of the right and left drive shafts is coupled to the spline fitting hole 210 so as not to be relatively rotatable. Meanwhile, a spline fitting hole 220 is formed at the center portion of the second side gear 22. The other of the right and left drive shafts is coupled to the spline fitting hole 220 so as not to be relatively rotatable.

The first side gear 21 and the second side gear 22 are arranged side by side in the axial direction which is parallel to a rotational axis O of the housing 4. A pitch circle diameter $P_{21}$ of the first side gear 21 is larger than a pitch circle diameter $P_{22}$ of the second side gear 22. A pair of washers 51 is disposed between the first side gear 21 and the second side gear 22. The twist direction of helical teeth of the first side gear 21 and the twist direction of helical teeth of the second side gear 22 are opposite to each other.

The axial length of the first pinion gears 31 is longer than the axial length of the second pinion gears 32. The first pinion gears 31 are disposed to extend from the outer peripheral side of the first side gear 21 to the outer peripheral side of the second side gear 22. The second pinion gears 32 are disposed on the outer peripheral side of the second side gear 22. The first pinion gears 31 each have an axially one end-side gear portion 311 meshed with the first side gear 21, and an axially other end-side gear portion 312 meshed with the second pinion gears 32. The axially one end-side gear portion 311 and the axially other end-side gear portion 312 are integral with each other.

Figure 5:
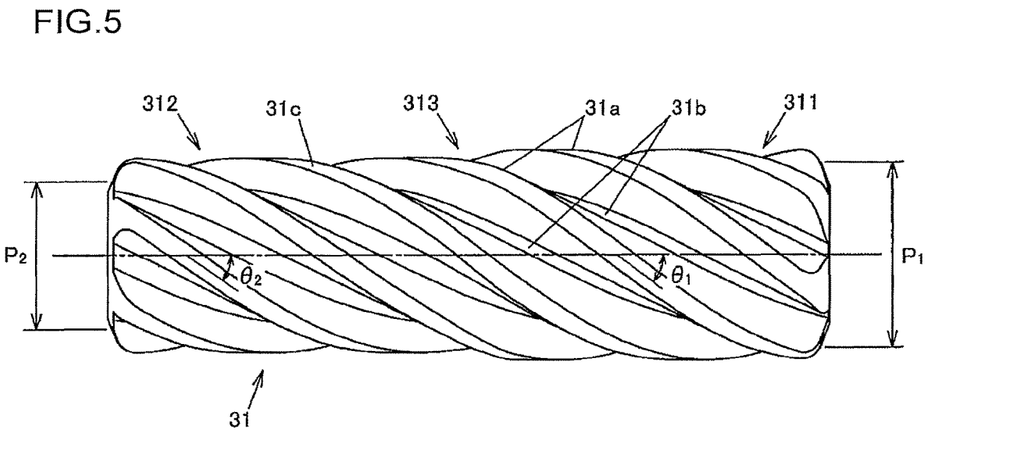
FIG. 5 is a side view illustrating a first pinion gear alone.

FIG. 5 is a side view illustrating the first pinion gear 31 alone. The axially one end-side gear portion 311 and the axially other end-side gear portion 312 have the same number of teeth, and are provided with tooth traces 31$a$ and tooth grooves 31$b$ that extend continuously. Tooth tip surfaces 31$c$ of the first pinion gear 31 each have a predetermined width in the circumferential direction of the first pinion gear 31. The axially one end-side gear portion 311 is provided on one end side, in the axial direction, with respect to a center portion 313, in the axial direction, of the first pinion gear 31. The axially other end-side gear portion 312 is provided on the other end side, in the axial direction, with respect to the center portion 313. That is, the first pinion gear 31 is divided in the axial direction into a portion meshed with the first side gear 21 and a portion meshed with the second pinion gears 32. The center portion 313 of the first pinion gear 31 is disposed at a position on the outer peripheral side of the washers 51 which are disposed between the first side gear 21 and the second side gear 22.

The axially one end-side gear portion 311 is formed to be larger in outside diameter than the axially other end-side gear portion 312. When the pitch circle diameter of the axially one end-side gear portion 311 is defined as $P_1$ and the pitch circle diameter of the axially other end-side gear portion 312 is defined as $P_2$, $P_1$ is larger than $P_2$, and the ratio of $P_1$ to $P_2$ ($P_1/P_2$) is 1.05 to 1.15, for example. In the example illustrated in FIG. 5, this ratio is set to about 1.1. When the torsional angle of the tooth traces 31$a$ in the axially one end-side gear portion 311 is defined as $\theta_1$ and the torsional angle of the tooth traces 31$a$ in the axially other end-side gear portion 312 is defined as $\theta_2$, $\theta_1$ is larger than $\theta_2$, and the ratio therebetween is the same as the ratio between the pitch circle diameters of the gear portions 311 and 312, for example. At the center portion 313 of the first pinion gear 31, in order to prevent stress concentration, the pitch circle diameter and the torsional angle become gradually smaller from the axially one end-side gear portion 311 toward the axially other end-side gear portion 312.

In this way, because the pitch circle diameter $P_2$ of the axially other end-side gear portion 312 is smaller than the pitch circle diameter $P_1$ of the axially one end-side gear portion 311 and the torsional angle $\theta_2$ of the tooth traces in the axially other end-side gear portion 312 is smaller than the torsional angle $\theta_1$ of the tooth traces in the axially one end-side gear portion 311, a torque bias ratio (TBR) for a case where the first side gear 21 is rotated faster than the second side gear 22 and a TBR for a case where the second side gear 22 is rotated faster than the first side gear 21 are equalized with each other. In the present embodiment, the pitch circle diameter $P_{21}$ of the first side gear 21 is larger than the pitch circle diameter $P_{22}$ of the second side gear 22. Thus, if the torsional angle $\theta_1$ of the tooth traces of the axially one end-side gear portion 311 and the torsional angle θ₂ of the tooth traces of the axially other end-side gear portion 312 were equal to each other, there would be a difference in differential motion restriction force which restricts differential rotation of the side gears 21 and 22 during a right turn and a left turn of the vehicle due to the difference in diameter between the first side gear 21 and the second side gear 22. In the present embodiment, however, such an imbalance in TBR is suppressed because the first pinion gear 31 is configured as described above.

The two second pinion gears 32 in each of the pinion gear sets 3 are disposed side by side in the circumferential direction of the second side gear 22, and meshed with the axially other end-side gear portion 312 of the first pinion gear 31. In addition, the two second pinion gears 32 are meshed with the second side gear 22 at positions away from each other in the circumferential direction of the second side gear 22. That is, each of the second pinion gears 32 makes alternate meshing in which the second pinion gear 32 is meshed with the axially other end-side gear portion 312 of the first pinion gear 31 at one part of the second pinion gear 32 in the circumferential direction and meshed with the second side gear 22 at another part thereof in the circumferential direction.

The second pinion gears 32 have a uniform pitch circle diameter and a uniform torsional angle of the tooth traces over the entirety thereof in the axial direction. In addition, the axial length of the second pinion gears 32 is equivalent to the axial length of the axially other end-side gear portion 312 of the first pinion gear 31, and the second pinion gears 32 are not positioned on the outer peripheral side of the first side gear 21. The axially other end-side gear portion 312 of the first pinion gear 31 is meshed with the pair of second pinion gears 32 at positions on the radially outer side of the second side gear 22. A gap is formed between the axially other end-side gear portion 312 of the first pinion gear 31 and the second side gear 22 with no other member interposed therebetween.

The axial length of the second side gear 22 is shorter than the axial length of the first side gear 21. In addition, the length of meshing between the second side gear 22 and the second pinion gears 32 in the axial direction is shorter than the length of meshing between the first side gear 21 and the first pinion gear 31 in the same direction. This configuration is achieved by the second side gear 22 being meshed with the two second pinion gears 32 of each of the pinion gear sets 3. That is, the second side gear 22 is meshed with the two second pinion gears 32. Therefore, a sufficient drive force can be transferred to the second side gear 22 even if the axial length of the second side gear 22 is shorter than the axial length of the first side gear 21.

In addition, the axial length of the second pinion gears 32 and the axial length of the axially other end-side gear portion 312 of the first pinion gear 31 are longer than the axial length of the second side gear 22, and the second pinion gears 32 and the axially other end-side gear portion 312 of the first pinion gear 31 are meshed with each other on the opening side of a first housing member 41 than the second side gear 22. That is, the second pinion gears 32 are meshed with the axially other end-side gear portion 312 of the first pinion gear 31 over the entirety thereof in the axial direction, and meshed with the second side gear 22 at a part thereof in the axial direction.

The housing 4 has the first housing member 41 in a bottomed cylindrical shape, and a second housing member 42 fixed to the opening side of the first housing member 41. The first housing member 41 houses the first and second side gears 21 and 22, and is provided with bores 40 that each serve as a pinion gear housing space in which the first pinion gear 31 and the two second pinion gears 32 are held. In the present embodiment, the differential device 1 has three pinion gear sets 3, and thus the first housing member 41 is provided with three bores 40. The bores 40 are open to the opening side of the first housing member 41.

The bores 40 each include a first housing space 401 that houses the first pinion gear 31 and two second housing spaces 402 that house the two second pinion gears 32. The first housing space 401 and the two second housing spaces 402 communicate with each other. The two second housing spaces 402 are formed so as to be both end portions of the bore 40 in the circumferential direction of the first housing member 41. The first housing space 401 is formed between the two second housing spaces 402. End portions of the first housing space 401 and the two second housing spaces 402 are open to the opening side of the first housing member 41.

When the first pinion gear 31 is rotated in the bore 40, the tooth tip surfaces 31c of the first pinion gear 31 are slid on an inner surface 401a of the first housing space 401. When the second pinion gears 32 are rotated in the bore 40, in addition, tooth tip surfaces 32c of the second pinion gears 32 are slid on inner surfaces 402a of the second housing spaces 402. A frictional resistance caused on the tooth tip surfaces 31c and 32c of the first and second pinion gears 31 and 32 through such sliding serves as a differential motion restriction force that restricts differential rotation of the first and second side gears 21 and 22. When one of the right and left wheels slips, a drive force that matches the differential motion restriction force is transferred to the other wheel.

The first housing member 41 has: a cylindrical portion 411 having the three bores 40; a bottom portion 412 that projects inward from one end portion of the cylindrical portion 411; a flange portion 413 that projects outward from the other end portion of the cylindrical portion 411; and a conduit portion 414 that projects in the axial direction from the center portion of the bottom portion 412 to allow a coupling portion (a stem portion of a constant-velocity joint) of one of the drive shafts to be inserted therethrough. The cylindrical portion 411, the bottom portion 412, the flange portion 413, and the conduit portion 414 are integral with each other. An oil groove 414a that allows lubricating oil to flow is formed in the inner surface of the conduit portion 414.

The first housing space 401 and the second housing spaces 402 extend in the axial direction from an end portion of the cylindrical portion 411 that is close to the opening of the first housing member 41 toward the bottom portion 412. The axial length of the second housing spaces 402 is shorter than the axial length of the first housing space 401. Oil holes 412a that allow lubricating oil to flow between the first housing space 401 and the outside of the housing 4 are formed in the bottom portion 412 so as to penetrate the bottom portion 412 in the axial direction.

A first hollow portion 403, which a housing space for housing the first side gear 21, and a second hollow portion 404, which is a housing space for housing the second side gear 22, are formed side by side in the axial direction at the center portion of the cylindrical portion 411 in the first housing member 41. The first hollow portion 403 is provided on the deeper side of the first housing member 41 (near the bottom portion 412). The second hollow portion 404 is provided on the opening side of the first housing member 41. The first hollow portion 403 communicates with the first housing spaces 401 of the bores 40, and does not communicate with the second housing spaces 402. The second hollow portion 404 communicates with the first housing spaces 401 and the second housing spaces 402 of the bores 40. In the first hollow portion 403, a pair of washers 52 is disposed between the bottom portion 412 of the first housing member 41 and the first side gear 21.

The first pinion gear 31 is housed in each of the first housing spaces 401 such that the axially one end-side gear portion 311 is located on the deeper side and that the axially other end-side gear portion 312 is located on the opening side. In addition, the second side gear 22, which is one of the first and second side gears 21 and 22 that has the smaller pitch circle diameter, is disposed in the first housing member 41 on the opening side thereof. Consequently, a gap is formed between the axially other end-side gear portion 312 of the first pinion gear 31 and the second side gear 22.

The cylindrical portion 411 of the first housing member 41 is provided with depressed portions 410 recessed from the outer peripheral portion thereof toward the first hollow portion 403. The depressed portions 410 are formed by cutting, for example, and provided at positions between the first housing spaces 401 of the three bores 40 in the circumferential direction of the cylindrical portion 411. That is, in the present embodiment, the cylindrical portion 411 is provided with three depressed portions 410. In FIG. 4, the outlines of the depressed portions 410 are indicated by the dashed lines.

In addition, the depressed portions 410 are provided to be closer to the bottom portion 412 than the second housing spaces 402. In the case where the first housing member 41 is seen in the axial direction, the second housing spaces 402, which house the second pinion gears 32, and the depressed portions 410 partially overlap each other. In other words, at least a part of the second housing spaces 402 and at least a part of the depressed portions 410 are formed side by side in the axial direction of the cylindrical portion 411.

The depressed portions 410 do not communicate with the bores 40, and communicate with the first hollow portion 403, which is a housing space for housing the first side gear 21. A communication hole 410a (see FIG. 1A) that communicates with the first hollow portion 403 opens in the deepest portion of each of the depressed portions 410. Consequently, it is possible to supply a sufficient amount of lubricating oil to the first hollow portion 403.

The second housing member 42 has: an annular plate portion 421 that blocks first ends of the bores 40 on the opening side of the first housing member 41; a flange portion 422 that abuts against the flange portion 413 of the first housing member 41; and a conduit portion 423 that projects in the axial direction from the annular plate portion 421 to allow a coupling portion of the other drive shaft to be inserted therethrough. The annular plate portion 421, the flange portion 422, and the conduit portion 423 are integral with each other. Oil holes 421a (see FIG. 2) that allow lubricating oil to flow are formed in the annular plate portion 421 so as to penetrate the annular plate portion 421 in the axial direction.

An oil groove 423a that allows lubricating oil to flow is formed in the inner surface of the conduit portion 423. The conduit portion 423 mainly projects outward in the axial direction from the annular plate portion 421. A part of the conduit portion 423 projects inward in the axial direction from the annular plate portion 421. A pair of washers 53 is disposed between the distal end portion of the conduit portion 423, which projects inward in the axial direction from the annular plate portion 421, and the second side gear 22.

The flange portion 413 of the first housing member 41 and the flange portion 422 of the second housing member 42 are fastened to each other by a plurality of bolts 43 (see FIG. 2). The housing 4 is rotatably supported on a differential carrier by a bearing (not illustrated), and rotated about the rotational axis O by a drive force input from a ring gear 61 indicated by the imaginary lines (long dashed double-short dashed lines) in FIG. 3. The flange portions 413 and 422 of the first and second housing members 41 and 42 have bolt insertion holes 413a and 422a, respectively, that allow shaft portions of bolts 62 for fixing the ring gear 61 to be inserted therethrough. In addition, the flange portion 413 of the first housing member 41 has screw holes 413b (see FIG. 1A) into which the bolts 43 is screwed for fastening the first housing member 41 to the second housing member 42.

When the housing 4 is rotated by a drive force input from the ring gear 61, the drive force is transferred to the pinion gear sets 3 which are held by the cylindrical portion 411 of the first housing member 41, and the drive force is distributed from the first pinion gears 31 to the first side gear 21, and from the second pinion gears 32 to the second side gear 22. In the case where the first side gear 21 and the second side gear 22 are rotated at the same speed as each other, the first pinion gears 31 and the second pinion gears 32 are not rotated in the bores 40.

On the other hand, when there is a rotational speed difference between the first side gear 21 and the second side gear 22 during a turn or the like, for example, the first pinion gears 31 and the second pinion gears 32 are rotated in the bores 40 at a speed that matches the rotational speed difference. In FIG. 4, the rotational directions of the first and second pinion gears 31 and 32 and the rotational direction of the second side gear 22 for a case where the second side gear 22 is rotated clockwise with respect to the first housing member 41 are indicated by the arrows.

When the first pinion gear 31 and the two second pinion gears 32 are rotated in each of the bores 40, the first pinion gear 31 receives a force directed inward in the radial direction of the first housing member 41 from one of the two second pinion gears 32, and receives a force directed outward in the radial direction of the first housing member 41 from the other second pinion gear 32. With such forces balanced with each other, tilt of the first pinion gear 31 in the radial direction is suppressed, and interference between the first pinion gear 31 and the second side gear 22 is avoided.

In the embodiment described above, the first pinion gears 31 and the second pinion gears 32 are meshed with each other on the outer peripheral side of the second side gear 22. Thus, the device size can be reduced in the axial direction compared to a case where pinion gears are meshed with each other on the outer side, in the axial direction, with respect to a pair of side gears as described in JP 2002-081526 A, for example. In addition, interference between the first pinion gear 31 and the second side gear 22 can be avoided without requiring a component (a member interposed between the first pinion gear 31 and the second side gear 22) corresponding to the gear support portion 20F which is required in the differential device according to JP 2009-197976 A. Thus, an increase in man-hours required for processing the housing 4 can be suppressed. Consequently, it is possible to reduce the device size while suppressing an increase in man-hours for processing.

In the present embodiment, in addition, the length of meshing between the second side gear 22 and the second pinion gears 32 can be made shorter than the length of meshing between the first side gear 21 and the first pinion gears 31. Thus, it is possible to further reduce the device size by reducing the size of the second side gear 22.

In the present embodiment, in addition, the second side gear 22 is disposed on the opening side of the first housing member 41. Thus, the second pinion gears 32, which are meshed with the second side gear 22, can be disposed around the opening of the first housing member 41, and the axial length of the second housing spaces 402, which house the second pinion gears 32, can be made shorter than that of the first housing spaces 401. Consequently, a component (a member that supports an end surface, on one side, of the second pinion gear 32) corresponding to the projecting portion 21C of the differential device according to JP 2009-197976 A, for example, is not required, which makes it possible to further suppress an increase in man-hours required for processing the housing 4.

In the present embodiment, in addition, the depressed portions 410 are formed for lightening in wastefully thick portions (excessively thick portions) of the cylindrical portion 411 of the first housing member 41 formed by reducing the axial length of the second housing spaces 402. Thus, a weight reduction can be achieved without impairing the strength of the first housing member 41.

The present invention can be modified, as appropriate, without departing from the scope and spirit of the present invention. For example, in the embodiment described above, the differential device 1 has three pinion gear sets 3. However, the present invention is not limited thereto, and the differential device 1 may have two or four or more pinion gear sets 3. In addition, the specifications of the two second pinion gears 32 in each of the pinion gear sets 3 may not be the same as each other. For example, the pitch circle diameter of one of the second pinion gears 32 that carries a higher load during forward travel of the vehicle may be made larger than the pitch circle diameter of the other second pinion gear 32.

In addition, the depressed portions 410 may not necessarily communicate with the first hollow portion 403. Furthermore, the cylindrical portion 411 of the first housing member 41 may not necessarily be provided with the depressed portions 410, so that the outside diameter of the cylindrical portion 411 on the outer side of the first side gear 21 may be uniform over the entire periphery.

In addition, the pitch circle diameter of the second side gear 22 may be the same as the pitch circle diameter of the first side gear 21, or the pitch circle diameter of the axially other end-side gear portion 312 of the first pinion gear 31 may be the same as the pitch circle diameter of the axially one end-side gear portion 311 thereof as long as interference between the first pinion gears 31 and the second side gear 22 can be avoided.

What is claimed is:

1. A differential device comprising:
   first and second side gears disposed side by side in a rotational axis direction;
   a pinion gear set composed of a plurality of pinion gears meshed with each other; and
   a housing that holds the pinion gears, wherein
   the first and second side gears are coupled to each other by the pinion gear set so as to make differential motion;
   the pinion gear set has a first pinion gear meshed with the first side gear and a plurality of second pinion gears meshed with the second side gear, the first pinion gear and the second pinion gears being held in parallel with each other by the housing;
   the first pinion gear has an axially one end-side gear portion meshed with the first side gear and an axially other end-side gear portion meshed with the second pinion gears, the axially one end-side gear portion and the axially other end-side gear portion being integral with each other;
   the second pinion gears are meshed with the second side gear at positions away from each other in a circumferential direction of the second side gear;
   the axially other end-side gear portion of the first pinion gear is meshed with the second pinion gears at positions on a radially outer side of the second side gear;
   the first and second side gears and the first and second pinion gears are each a helical gear;
   a pitch circle diameter of the axially other end-side gear portion of the first pinion gear is smaller than a pitch circle diameter of the axially one end-side gear portion;
   the housing has a first housing member in a bottomed cylindrical shape and a second housing member fixed to an opening side of the first housing member, the first housing member housing the first and second side gears and being provided with a pinion gear housing space in which the first pinion gear and the second pinion gears are held;
   the pinion gear housing space of the housing opens toward the opening side of the first housing member, and has a first housing space that houses the first pinion gear and a second housing space that houses the second pinion gears, the first and second housing spaces communicating with each other;
   the first housing member is provided with a depressed portion recessed from an outer peripheral portion of the first housing member toward a housing space for the first side gear; and
   the second housing space and the depressed portion overlap each other in a case where the first housing member is seen in the rotational axis direction.

2. The differential device according to claim 1, wherein:
   a pitch circle diameter of the second side gear is smaller than a pitch circle diameter of the first side gear, and the second side gear is disposed on the opening side of the first housing member with respect to the first side gear.

3. The differential device according to claim 2, wherein:
   an axial length of the second housing space is shorter than an axial length of the first housing space.

4. The differential device according to claim 1, wherein the depressed portion communicates with the housing space for the first side gear.

5. The differential device according to claim 1, wherein a torsional angle of tooth traces in the axially other end-side gear portion is smaller than a torsional angle of tooth traces in the axially one end-side gear portion.

6. A differential device comprising:
   first and second side gears disposed side by side in a rotational axis direction;
   a pinion gear set composed of a plurality of pinion gears meshed with each other; and
   a housing that holds the pinion gears, wherein
   the first and second side gears are coupled to each other by the pinion gear set so as to make differential motion;
   the pinion gear set has a first pinion gear meshed with the first side gear and a plurality of second pinion gears meshed with the second side gear, the first pinion gear and the second pinion gears being held in parallel with each other by the housing;
   the first pinion gear has an axially one end-side gear portion meshed with the first side gear and an axially other end-side gear portion meshed with the second pinion gears, the axially one end-side gear portion and the axially other end-side gear portion being integral with each other;

the axially other end-side gear portion of the first pinion gear is meshed with the second pinion gears at positions on a radially outer side of the second side gear;

the housing has a first housing member in a bottomed cylindrical shape and a second housing member fixed to an opening side of the first housing member, the first housing member housing the first and second side gears and being provided with a pinion gear housing space in which the first pinion gear and the second pinion gears are held;

the pinion gear housing space opens toward the opening side of the first housing member, and has a first housing space that houses the first pinion gear and a second housing space that houses the second pinion gears, the first and second housing spaces communicating with each other;

an axial length of the second housing space is shorter than an axial length of the first housing space the first and second side gears and the first and second pinion gears are each a helical gear;

a pitch circle diameter of the axially other end-side gear portion of the first pinion gear is smaller than a pitch circle diameter of the axially one end-side gear portion;

the first housing member is provided with a depressed portion recessed from an outer peripheral portion of the first housing member toward a housing space for the first side gear; and the second housing space and the depressed portion overlap each other in a case where the first housing member is seen in the rotational axis direction.

7. The differential device according to claim 6, wherein the pinion gear set includes two second pinion gears meshed with the first pinion gear, and the two second pillion gears are meshed with the second side gear at positions away from each other in a circumferential direction of the second side gear.

8. The differential device according to claim 6, wherein a torsional angle of tooth traces in the axially other end-side gear portion is smaller than a torsional angle of tooth traces in the axially one end-side gear portion.

\* \* \* \* \*